US009709412B2

(12) United States Patent
Yamada et al.

(10) Patent No.: US 9,709,412 B2
(45) Date of Patent: *Jul. 18, 2017

(54) NAVIGATION APPARATUS, VEHICLE INFORMATION DISPLAY APPARATUS, AND VEHICLE INFORMATION DISPLAY SYSTEM

(71) Applicant: MITSUBISHI ELECTRIC CORPORATION, Tokyo (JP)

(72) Inventors: Yusaku Yamada, Tokyo (JP); Yuji Funaba, Tokyo (JP); Yasuhiro Ishii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,872

(22) Filed: Aug. 5, 2015

(65) Prior Publication Data

US 2015/0336467 A1 Nov. 26, 2015

Related U.S. Application Data

(62) Division of application No. 13/516,265, filed as application No. PCT/JP2010/000427 on Jan. 26, 2010, now Pat. No. 9,134,136.

(51) Int. Cl.
*G01C 21/26* (2006.01)
*G01C 21/32* (2006.01)
(Continued)

(52) U.S. Cl.
CPC ...... *G01C 21/3469* (2013.01); *B60L 11/1809* (2013.01); *B60L 11/1861* (2013.01);
(Continued)

(58) Field of Classification Search
CPC .... G01C 21/3697; G01C 21/34; G01C 21/30; G01C 21/343; G01C 21/367; G01C 21/26;
(Continued)

(56) References Cited

U.S. PATENT DOCUMENTS 6,864,807 B2   3/2005   Todoriki et al.
7,203,517 B2   4/2007   Shimoda et al.
(Continued)

FOREIGN PATENT DOCUMENTS

DE      102 56 355 A1    11/2003
DE      102008039907 A1   7/2009
(Continued)

*Primary Examiner* — Jelani Smith
*Assistant Examiner* — Luis A Martinez Borrero
(74) *Attorney, Agent, or Firm* — Birch, Stewart, Kolasch & Birch, LLP

(57) ABSTRACT

An object of the present invention is to provide a navigation apparatus, a vehicle information display apparatus, and a vehicle information display system, that enables a travelable range to be recognized even while a user is not riding on an electric vehicle.
A vehicle information display system according to the present invention includes a navigation apparatus and a vehicle information display apparatus. The navigation apparatus includes: a storage section mounted on an electric vehicle, for storing map information and a destination; an own vehicle position information acquisition section for obtaining own vehicle position information; a remaining power amount acquisition section for obtaining a remaining power amount; a travel cost calculation section for calculating a power cost based on the map information, the destination, and the own vehicle position information; a travelable range calculation section for calculating a travelable range based on the power cost and the remaining power amount; and a communication section for transmitting (Continued)

vehicle information including the travelable range to the outside. The vehicle information display apparatus includes: a communication section installed outside the electric vehicle, for receiving the vehicle information; and a control section for outputting the vehicle information.

17 Claims, 10 Drawing Sheets

(51) Int. Cl.
G01C 21/00 (2006.01)
G01C 21/34 (2006.01)
B60L 11/18 (2006.01)
B60L 15/20 (2006.01)

(52) U.S. Cl.
CPC ..... *B60L 15/2045* (2013.01); *B60L 2240/622* (2013.01); *B60L 2250/16* (2013.01); *B60L 2260/52* (2013.01); *B60L 2260/54* (2013.01); *B60L 2260/56* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/72* (2013.01); *Y02T 10/7283* (2013.01); *Y02T 10/7291* (2013.01); *Y02T 90/14* (2013.01); *Y02T 90/16* (2013.01); *Y02T 90/161* (2013.01); *Y02T 90/162* (2013.01); *Y02T 90/163* (2013.01)

(58) Field of Classification Search
CPC ............ G01C 21/3484; G01C 21/3492; G01C 21/3446; Y02T 10/7241; Y02T 90/16; Y02T 10/84; Y02T 90/32; Y02T 90/34; Y02T 90/122; Y02T 90/163; Y02T 10/7005; Y02T 10/7044; Y02T 10/705; Y02T 10/7088; B60L 2240/662; B60L 3/12; B60L 11/18; B60L 11/123; B60L 1/02; B60L 2200/26; B60L 2240/70; B60L 11/1838; B60L 11/1861; B60L 2230/40
USPC ...... 701/22, 123, 533, 1, 2, 36, 99, 101, 26, 701/412, 21, 19, 20, 117, 70, 416
See application file for complete search history.

(56) References Cited

U.S. PATENT DOCUMENTS

| | | | |
|---|---|---|---|
| 7,493,209 B1* | 2/2009 | Altrichter | G01C 21/3469 340/902 |
| 7,554,441 B2 | 6/2009 | Viegers et al. | |
| 7,623,949 B2* | 11/2009 | Nou | G07C 5/008 340/539.13 |
| 7,761,203 B2 | 7/2010 | Yamada | |
| 7,996,045 B1 | 8/2011 | Bauer et al. | |
| 8,103,439 B2 | 1/2012 | Onishi et al. | |
| 8,140,358 B1* | 3/2012 | Ling | G06Q 40/08 340/439 |
| 8,229,613 B2 | 7/2012 | Kato et al. | |
| 8,829,910 B2* | 9/2014 | Nishidai | G01R 31/3689 324/427 |
| 9,134,136 B2* | 9/2015 | Yamada | B60L 11/1861 |
| 2003/0006914 A1 | 1/2003 | Todoriki et al. | |
| 2004/0204822 A1 | 10/2004 | Kohno et al. | |
| 2005/0005298 A1* | 1/2005 | Tranchina | H04N 21/43632 725/81 |
| 2005/0065713 A1* | 3/2005 | Yamada | G01C 21/34 701/400 |
| 2005/0090279 A9 | 4/2005 | Witkowski et al. | |
| 2005/0228553 A1 | 10/2005 | Tryon | |
| 2005/0273219 A1* | 12/2005 | Kitao | B60R 25/00 701/2 |
| 2006/0293802 A1 | 12/2006 | Kitao et al. | |
| 2007/0029121 A1 | 2/2007 | Saitou et al. | |
| 2008/0021628 A1 | 1/2008 | Tryon | |
| 2008/0027639 A1 | 1/2008 | Tryon | |
| 2008/0119982 A1* | 5/2008 | Yamada | B60L 3/12 701/33.4 |
| 2008/0262667 A1 | 10/2008 | Otabe | |
| 2008/0262668 A1 | 10/2008 | Yamada | |
| 2009/0027056 A1* | 1/2009 | Huang | B60L 11/1857 324/439 |
| 2009/0034630 A1 | 2/2009 | Cho et al. | |
| 2009/0144150 A1 | 6/2009 | Sakakibara et al. | |
| 2009/0177352 A1 | 7/2009 | Grau et al. | |
| 2009/0254266 A1 | 10/2009 | Altrichter et al. | |
| 2009/0261957 A1 | 10/2009 | Kido | |
| 2009/0277701 A1 | 11/2009 | Soma et al. | |
| 2010/0036600 A1 | 2/2010 | Shinmyoh et al. | |
| 2010/0088011 A1* | 4/2010 | Bruce | G01C 21/20 701/532 |
| 2010/0114474 A1 | 5/2010 | Suganuma et al. | |
| 2010/0131139 A1* | 5/2010 | Sakai | B60K 6/46 701/22 |
| 2010/0169008 A1* | 7/2010 | Niwa | B60L 3/12 701/532 |
| 2010/0204863 A1* | 8/2010 | Sakamoto | B60K 6/445 701/22 |
| 2010/0207772 A1 | 8/2010 | Yamamoto | |
| 2010/0235025 A1 | 9/2010 | Richter et al. | |
| 2011/0000726 A1* | 1/2011 | Tanaka | B60K 6/48 180/65.265 |
| 2011/0022305 A1* | 1/2011 | Okamoto | G01C 21/36 701/533 |
| 2011/0046850 A1 | 2/2011 | Kido | |
| 2011/0125357 A1 | 5/2011 | Harumoto et al. | |
| 2011/0208428 A1* | 8/2011 | Matsubara | G01C 21/367 701/532 |
| 2011/0213550 A1 | 9/2011 | Ishizuka | |
| 2011/0224841 A1* | 9/2011 | Profitt-Brown | B60K 35/00 701/2 |
| 2011/0224900 A1* | 9/2011 | Hiruta | G01C 21/3469 701/533 |
| 2011/0225105 A1* | 9/2011 | Scholer | G06Q 50/06 705/412 |
| 2011/0291824 A1 | 12/2011 | Kido | |
| 2011/0291917 A1 | 12/2011 | Kido | |
| 2012/0010816 A1 | 1/2012 | Uyama et al. | |
| 2012/0136574 A1* | 5/2012 | Kobayashi | B60L 3/12 701/533 |
| 2012/0253655 A1* | 10/2012 | Yamada | B60L 11/1861 701/409 |
| 2013/0261914 A1* | 10/2013 | Ingram | B64C 39/024 701/70 |
| 2014/0074391 A1* | 3/2014 | Tate, Jr. | B60L 11/1862 701/400 |

FOREIGN PATENT DOCUMENTS

| | | |
|---|---|---|
| DE | 102010000387 A1 | 8/2010 |
| DE | 10 2009 038 431 A1 | 2/2011 |
| EP | 1602897 A1 | 12/2005 |
| EP | 1275936 B1 | 8/2008 |
| JP | 9-119839 A | 5/1997 |
| JP | 2001-183150 A | 7/2001 |
| JP | 2003-329474 A | 11/2003 |
| JP | 3758140 B2 | 3/2006 |
| JP | 2008-11681 A | 1/2008 |
| JP | 2009-141991 A | 6/2009 |
| JP | 2009-250621 A | 10/2009 |
| JP | 2009-298331 A | 12/2009 |

\* cited by examiner

F I G. 6
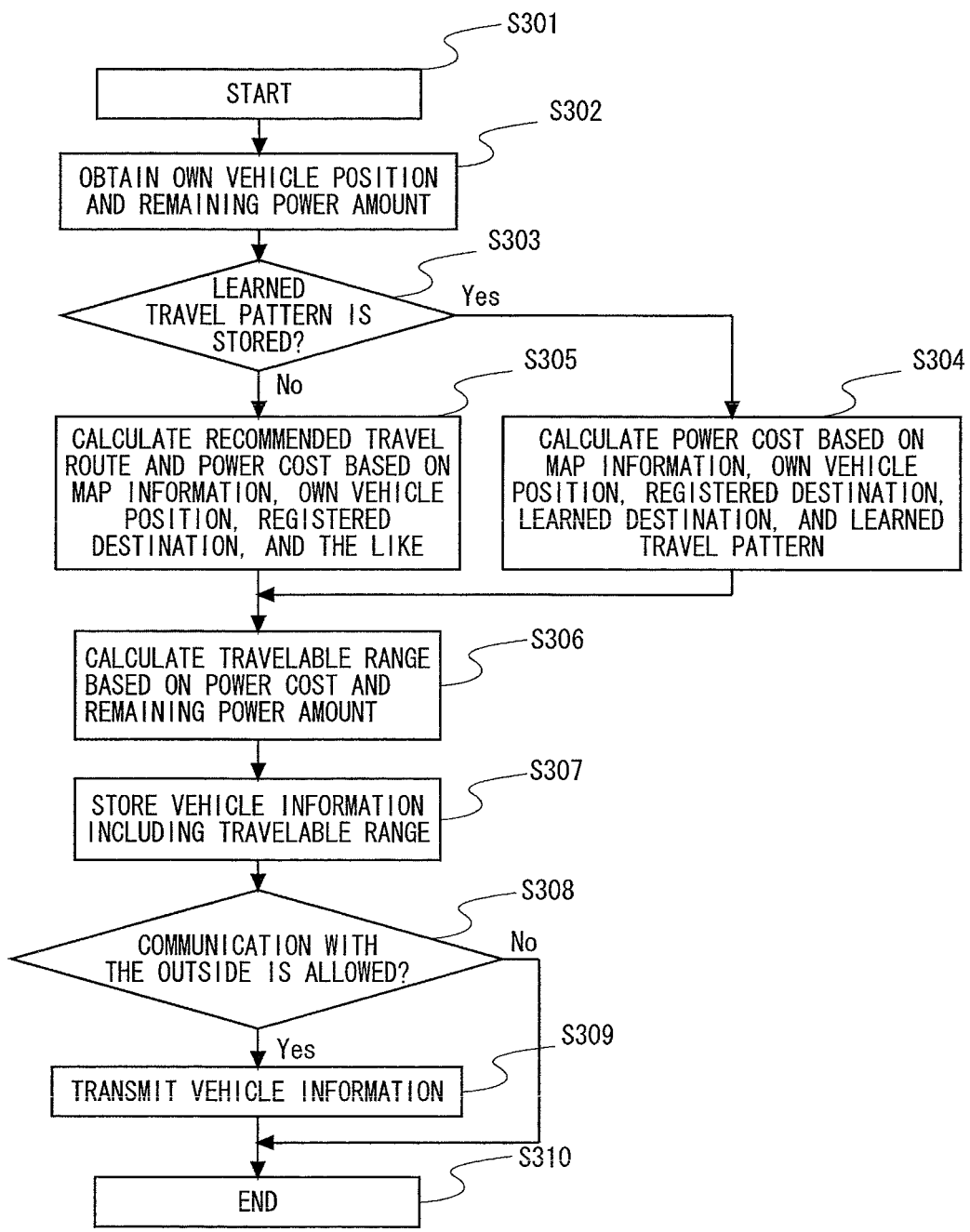

F I G. 7
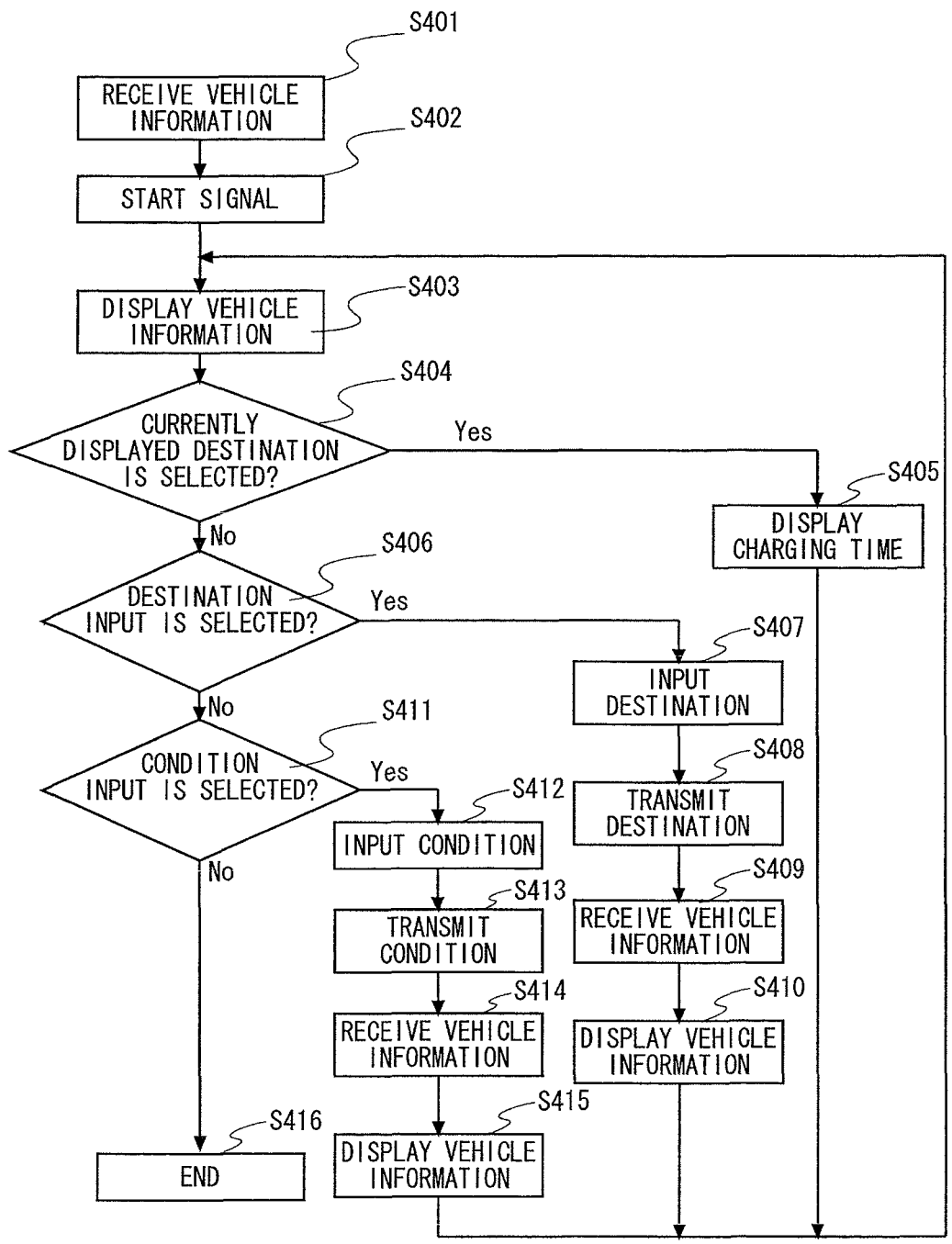

FIG. 8
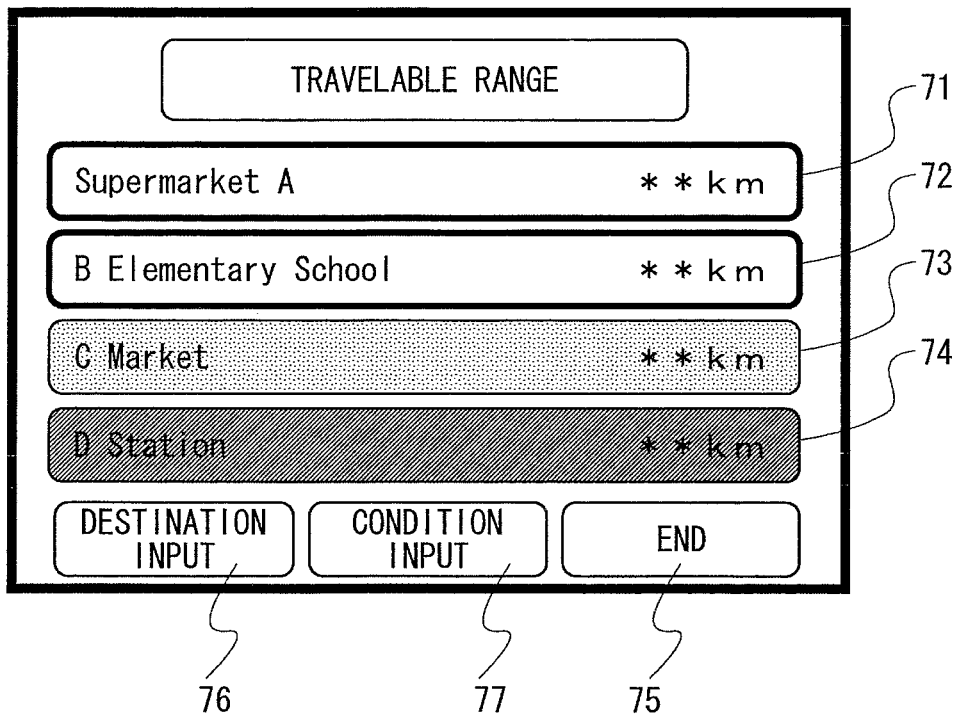
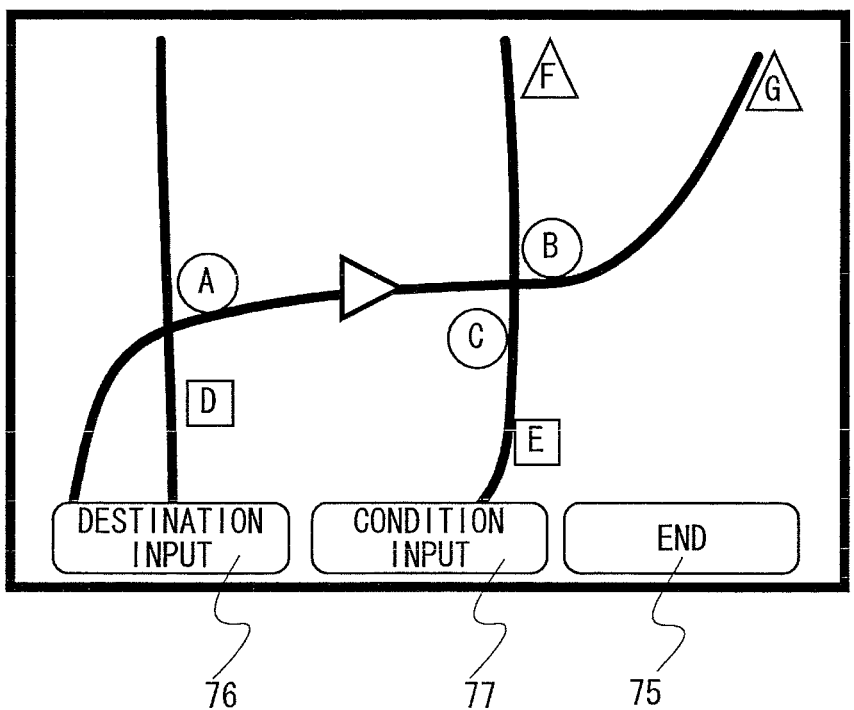

F I G. 1 0
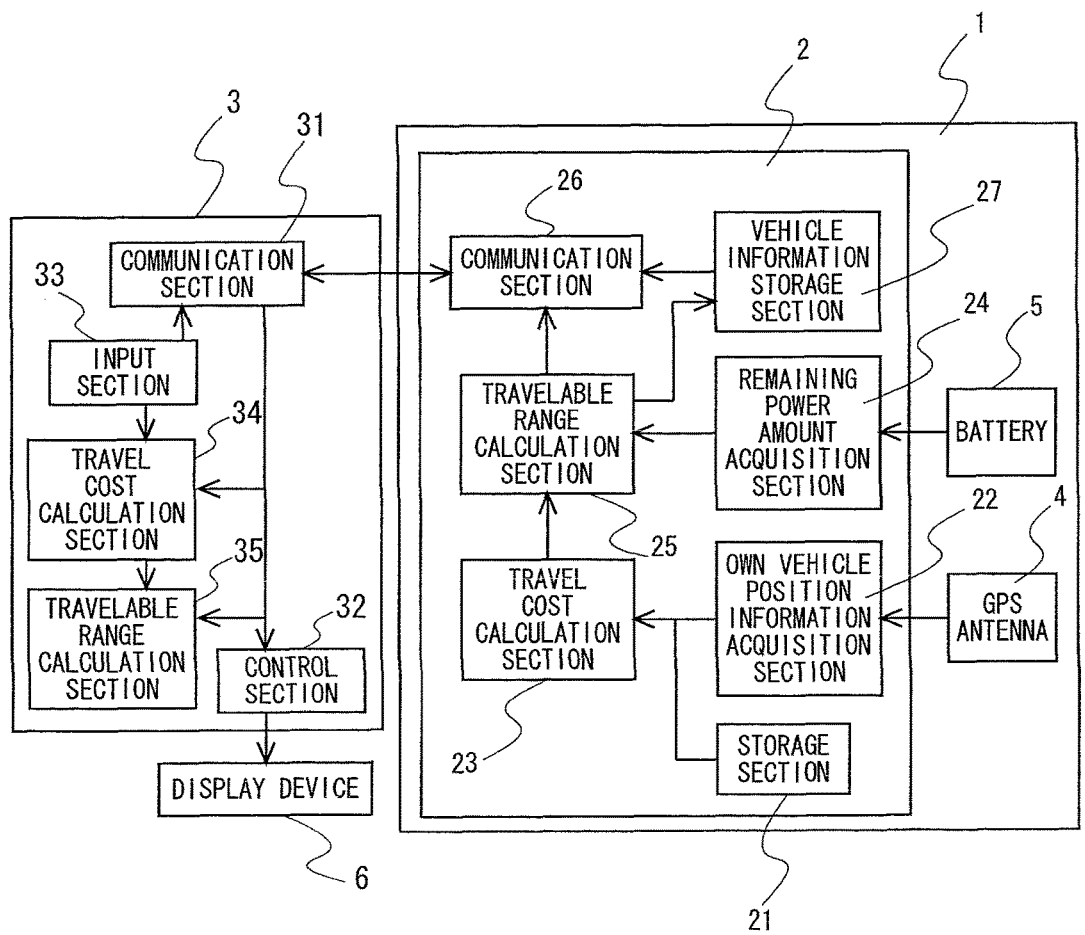

NAVIGATION APPARATUS, VEHICLE INFORMATION DISPLAY APPARATUS, AND VEHICLE INFORMATION DISPLAY SYSTEM

This application is a Divisional of copending application Ser. No. 13/516,265, filed on Jun. 15, 2012, which was filed as PCT International Application No. PCT/JP2010/000427 on Jan. 26, 2010, all of which are hereby expressly incorporated by reference into the present application.

TECHNICAL FIELD

The present invention relates to a navigation apparatus that calculates a travelable range based on a remaining power amount of an electric vehicle, a vehicle information display apparatus that displays the travelable range, and a vehicle information display system.

BACKGROUND ART

In recent years, studies have been made for a navigation apparatus that is mounted in an electric vehicle and displays a travelable distance in consideration of a remaining power amount (for example, see Patent Document 1).

Patent Document 1: Japanese Patent Application Laid-Open No. 9-119839 (1997) (page 2, FIG. 1)

DISCLOSURE OF THE INVENTION

Problems to be Solved by the Invention

However, in the conventional navigation apparatus as described above, a user can recognize a travelable range including a travel distance only while the user is riding on the electric vehicle. In a case where the user can recognize the travelable range only while the user is riding on the electric vehicle, a problem arises that, if the user determines a destination and boards the electric vehicle and then it turns out that a current remaining power amount is insufficient for arriving at the destination or for making a round trip between a current location and the destination, the vehicle has to be charged and therefore time is required before starting.

The present invention is made to solve such a problem, and an object of the present invention is to provide a navigation apparatus, a vehicle information display apparatus, and a vehicle information display system, that enables a travelable range to be recognized even while a user is not riding on an electric vehicle.

Means for Solving the Problems

A navigation apparatus according to the present invention includes: a storage section mounted on an electric vehicle, for storing map information and a destination; an own vehicle position information acquisition section for obtaining own vehicle position information; a remaining power amount acquisition section for obtaining a remaining power amount; a travel cost calculation section for calculating a power cost based on the map information, the destination, and the own vehicle position information; a travelable range calculation section for calculating a travelable range based on the power cost and the remaining power amount; and a communication section for transmitting vehicle information including the travelable range to the outside of the vehicle, to allow the vehicle information to be displayed on a vehicle information display apparatus.

A vehicle information display apparatus according to the present invention includes: a communication section installed outside an electric vehicle, for receiving vehicle information including a travelable range; and a control section for outputting the vehicle information, to allow the vehicle information to be visibly displayed to a user of the vehicle.

A vehicle information display system according to the present invention includes a navigation apparatus and a vehicle information display apparatus. The navigation apparatus includes: a storage section mounted on an electric vehicle, for storing map information and a destination; an own vehicle position information acquisition section for obtaining own vehicle position information; a remaining power amount acquisition section for obtaining a remaining power amount; a travel cost calculation section for calculating a power cost based on the map information, the destination, and the own vehicle position information; a travelable range calculation section for calculating a travelable range based on the power cost and the remaining power amount; and a communication section for transmitting vehicle information including the travelable range to the outside of the vehicle, to allow the vehicle information to be displayed on a vehicle information display apparatus. The vehicle information display apparatus includes: a communication section installed outside the electric vehicle, for receiving the vehicle information; and a control section for outputting the vehicle information, to allow the vehicle information to be visibly displayed to a user of the vehicle.

Effects of the Invention

The present invention enables a user to recognize a travelable range even while the user is not riding on an electric vehicle.

BRIEF DESCRIPTION OF THE DRAWINGS

FIG. 6 A flowchart showing an operation of a navigation apparatus of a vehicle information display system according to an embodiment 2 of the present invention.

FIG. 7 A flowchart showing an operation of a vehicle information display apparatus of a vehicle information display system according to an embodiment 3 of the present invention.

FIG. 8 A diagram showing an exemplary display of vehicle information in the vehicle information display system according to the embodiment 3 of the present invention.

FIG. 10 A block diagram showing another configuration of the vehicle information display system according to the embodiment 3 of the present invention.

DESCRIPTION OF THE REFERENCE NUMERALS

1 electric vehicle; 2 navigation apparatus; 3 vehicle information display apparatus; 4 GPS antenna; 5 battery; 6 display device; 21 storage section; 22 own vehicle position information acquisition section; 23 travel cost calculation section; 24 remaining power amount acquisition section; 25 travelable range calculation section; 26 communication section; 27 vehicle information storage section; 28 driver identification section; 31 communication section; 32 control section; 33 input section; 34 travel cost calculation section; 35 travelable range calculation section

BEST MODE FOR CARRYING OUT THE INVENTION

Embodiment 1

Figure 1:
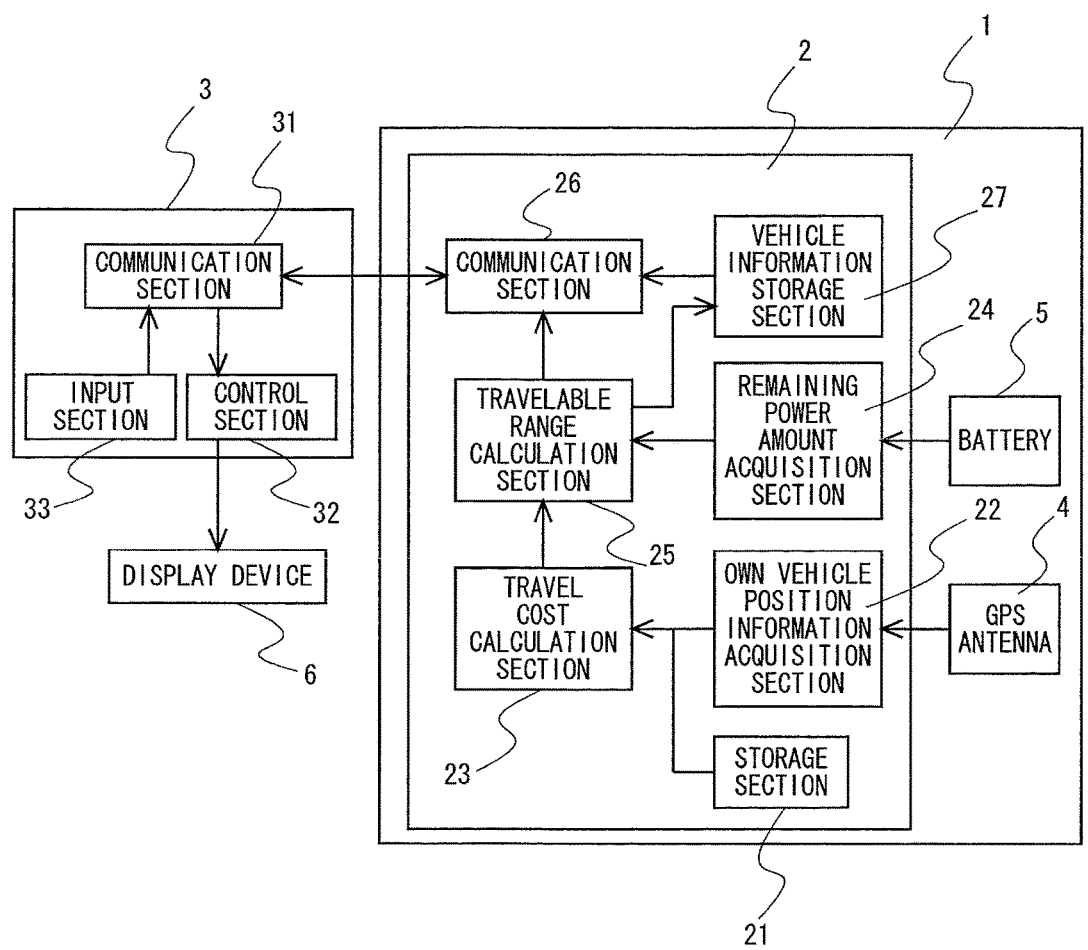
FIG. 1 A block diagram showing a configuration of a vehicle information display system according to an embodiment 1 of the present invention.

FIG. 1 is a block diagram showing a configuration of a vehicle information display system according to an embodiment 1 of the present invention. In the drawings, parts denoted by the same reference numeral are identical or equivalent to each other, and this applies to the whole of the description.

As shown in FIG. 1, the vehicle information display system according to the embodiment 1 of the present invention includes a navigation apparatus 2 mounted on an electric vehicle 1, and a vehicle information display apparatus 3 installed outside the electric vehicle 1.

The electric vehicle 1 includes the navigation apparatus 2 for guiding a travel route from an own vehicle position to a destination, a battery 5 for storing power, and a GPS (Global Positioning System) antenna 4 for receiving a radio wave transmitted from a satellite.

The navigation apparatus 2 includes a storage section 21, an own vehicle position information acquisition section 22, and a travel cost calculation section 23. The storage section 21 stores map information, a destination including a registered destination that is preliminarily registered by a user, and attached information including speed information such as a speed limit and a peak-time average speed. The own vehicle position information acquisition section 22 obtains own vehicle position information based on a GPS signal received from the GPS antenna 4 that is mounted on the electric vehicle 1. The travel cost calculation section 23 calculates a recommended travel route in consideration of a travel cost (which will be described later) necessary for traveling from the own vehicle position to the destination, based on the own vehicle position information obtained by the own vehicle position information acquisition section 22 and the map information and the destination stored in the storage section 21. The travel cost calculation section 23 calculates a power cost necessary for traveling from the own vehicle position to the destination or making a round trip between the own vehicle position and the destination through this recommended travel route. The map information includes road information, geographic information, facility information, or the like. The road information is indicated by a node that represents a spot, and a link that connects the nodes to each other. The geographic information includes spot's height information, link's slope information, and the like. The facility information indicates the position, and the like, of a facility serving as the destination. Here, the travel cost necessary for the travel is called a link cost, which is obtained by, for example, adding various information including a traffic jam time and the like as the attached information to the length, the road width, and the road type (such as highway, non-highway, or expressway) of each link that are obtained from the map information. The link cost serves as an index of the easiness to travel the link.

Accordingly, in general, the travel cost calculation section 23 calculates, as the recommended travel route that is a so-called leading guide route, such a route that the total link cost connecting the current location to the destination is the lowest.

Then, the travel cost calculation section 23 converts the link cost into the power cost, and calculates the power cost, that is, power consumption, necessary for traveling the recommended travel route.

Instead, it may be also conceivable to calculate, as the travel cost of each link, not the link cost but a power cost that represents power to be consumed for traveling the link. In this case, such a route that the total power cost is the lowest is guided as the recommended travel route. That is, in this case, such a route that the power consumption is the smallest (a route capable of economical driving) is guided.

Alternatively, as the travel cost of each link, both of the link cost serving as the above-mentioned index of the easiness to travel and the power cost that is the power consumption necessary for traveling the link may be calculated. This can save the trouble of converting the link cost into the power cost.

Then, in the following description, for the simplification of the description, the travel cost is regarded as a broader concept including both of the link cost and the power cost. The concept of calculating includes simply reading out a stored value, too.

The navigation apparatus 2 further includes a remaining power amount acquisition section 24 and a travelable range calculation section 25. The remaining power amount acquisition section 24 obtains a remaining power amount from the battery 5 that is mounted on the electric vehicle 1. The travelable range calculation section 25 calculates a travelable distance for each destination based on the power cost calculated by the travel cost calculation section 23 and the remaining power amount. An aggregation of more than one results of the calculation of the travelable distance for each destination means a travelable range of the electric vehicle. The travelable range calculation section 25 creates vehicle information including the calculated travelable range and a charging time, and stores the vehicle information in a vehicle information storage section 27 and moreover transmits the vehicle information to a communication section 26. The navigation apparatus 2 also includes a communication section 26 for transmitting and receiving information to and from the vehicle information display apparatus 3. It suffices that the travelable range includes a travelable distance for at least one destination.

The storage section 21 is formed of a recoding medium such as a HDD (Hard Disk Drive) device, a DVD (Digital Versatile Disk), or a CD (Compact Disk), and a drive device for driving the recoding medium. The vehicle information storage section 27 storing the vehicle information is formed of a rewritable storage member such as a HDD. In a case where the storage section 21 is formed of a rewritable storage member such as a HDD, the storage section 21 may also serve as the vehicle information storage section 27. The own vehicle position information acquisition section 22, the travel cost calculation section 23, the remaining power amount acquisition section 24, and the travelable range calculation section 25 are controlled by a program process using a CPU (Central Processing Unit).

The vehicle information display apparatus 3 includes a communication section 31 for transmitting and receiving information to and from the navigation apparatus 2, a control section 32 for outputting, to a display device 6, the vehicle information the communication section 31 has received from the navigation apparatus 2, and an input section 33 formed of a remote controller, a mouse, a keyboard, or the like. The display device 6 displays the outputted vehicle information, and may be provided in either of the outside and the inside of the vehicle information display apparatus 3 as long as it is outside the electric vehicle 1. The display device 6 provided outside the vehicle information display apparatus 3 may be, for example, a display of a TV, a personal computer, or a mobile phone. The control section 32 is controlled by a program process using a CPU (Central Processing Unit).

Although FIG. 1 shows an exemplary configuration in which the communication section 26 for transmitting the vehicle information to the vehicle information display apparatus 3 is provided inside the navigation apparatus 2, the communication section 26 may be provided outside the navigation apparatus 2. In such a case, the communication section 26 of the navigation apparatus 2 may be a communication device that is provided outside the navigation apparatus 2 and inside the electric vehicle 1. In the same manner, the communication section 31 for receiving the vehicle information from the navigation apparatus 2 may be provided outside the vehicle information display apparatus 3. The point is that the communication section 26 or the communication section 31 can be installed in any location as long as it can communicate necessary information. For example, a mobile phone can be mentioned as the communication section 31 provided outside the vehicle information display apparatus 3. Connection between each device and the communication device may be either of wired connection and wireless connection. It may be also acceptable that the communication device is placed on a holder part having a connector that is provided in each device.

Communication between the navigation apparatus 2 and the vehicle information display apparatus 3 may be wireless communication, or may be wired communication implemented by connecting the electric vehicle 1 to a connector while the electric vehicle 1 is parked in a garage. Since the electric vehicle 1 is connected to a charger when parked in a garage, the communication may be implemented by wire-connecting the navigation apparatus 2 and the vehicle information display apparatus 3 to each other via the charger. Moreover, the communication section 26 of the navigation apparatus 2 or the communication device provided outside the navigation apparatus 2 may be equipped with a function for connecting to Internet such as a wireless LAN, and may communicate via Internet with the vehicle information display apparatus 3 that is installed in a home, a manufacturer of the vehicle, or a manufacturer of the navigation system. At this time, a personal computer or a mobile phone may be adopted as the display device 6. Furthermore, the vehicle information may be stored in a portable storage medium such as a USB memory, for the communication between the navigation apparatus 2 and the vehicle information display apparatus 3. Here, a storage function may be attached to an engine key, a mobile phone, or the like, which thereby can be carried around.

Figure 2:
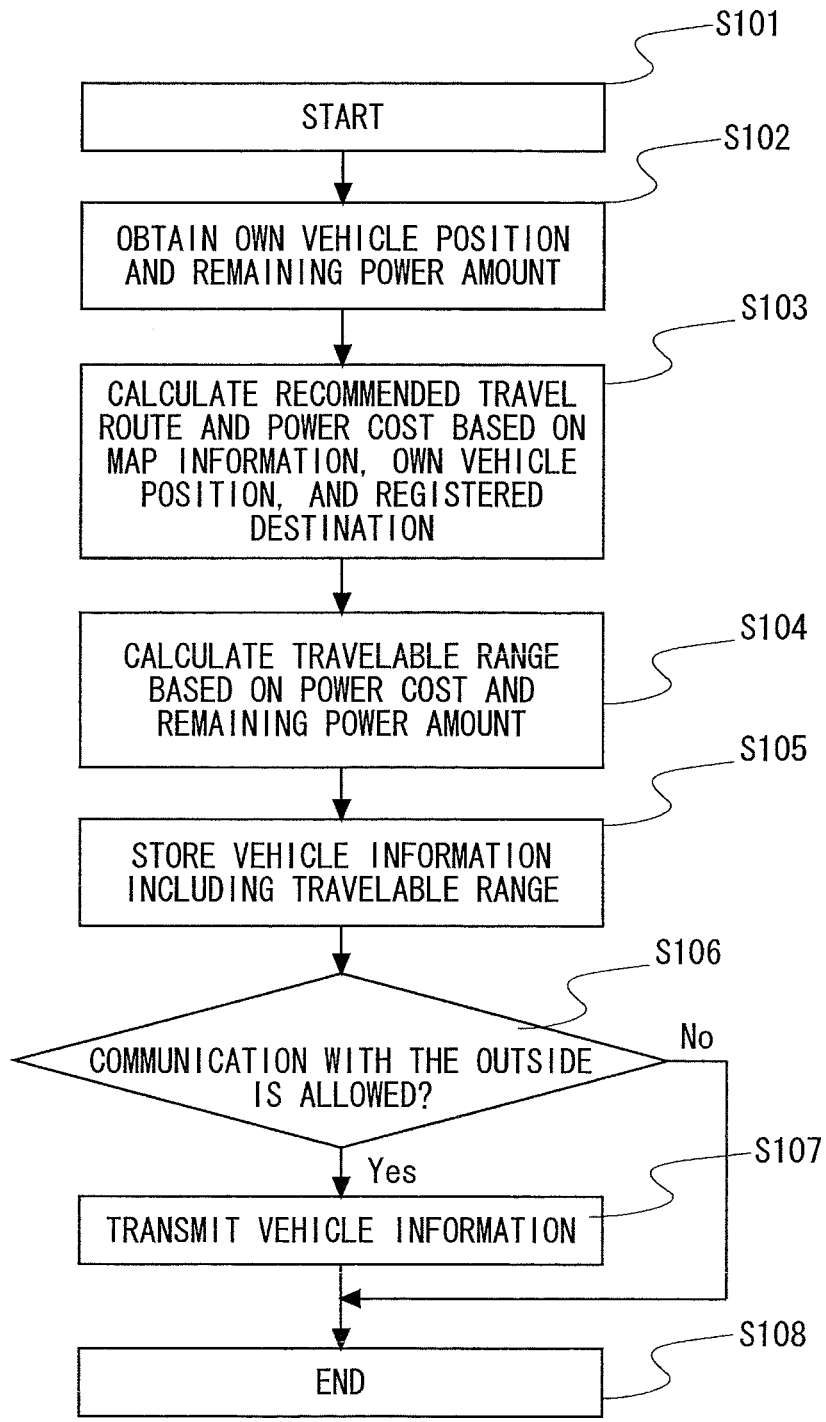
FIG. 2 A flowchart showing an operation of a navigation apparatus of the vehicle information display system according to the embodiment 1 of the present invention.

FIG. 2 is a flowchart showing an operation of the navigation apparatus of the vehicle information display system according to the embodiment 1 of the present invention.

As shown in FIG. 2, at a time of arrival at the home or at a time of key-off, the navigation apparatus 2 starts a travelable range calculation process (S101). Firstly, the own vehicle position information acquisition section 22 of the navigation apparatus 2 obtains the own vehicle position information from the GPS antenna 4, and the remaining power amount acquisition section 24 obtains the remaining power amount (S102).

Then, the travel cost calculation section 23 calculates the recommended travel route by using the own vehicle position information obtained by the own vehicle position information acquisition section 22 and the map information and the registered destination that are stored in the storage section 21. Based on this calculated recommended travel route, the power cost for each destination is calculated, and the calculated power cost is transmitted to the travelable range calculation section 25 (S103). In a case where the recommended travel route is stored in the storage section 21, it suffices that the travel cost calculation section 23 calculates the power cost by using the stored recommended travel route without calculating the recommended travel route.

The travelable range calculation section 25 of the navigation apparatus 2 calculates the travelable distance for each destination based on the remaining power amount obtained by the remaining power amount acquisition section 24 and the power cost calculated by the travel cost calculation section 23. Then, the travelable range calculation section 25 classifies a state into any of the three levels of (1) being capable of a round trip, (2) being capable of arriving at the destination but not capable of returning from the destination to the current location (not capable of a round trip), and (3) being not capable of arriving at the destination, and calculates the travelable range (S104). For example, in a case where the travel cost calculation section 23 calculates a power cost for a one-way trip from the own vehicle position to the destination, the travelable range calculation section 25 classifies as follows. That is, if the remaining power amount is equal to or more than twice the power cost, the state is classified as (1) being capable of a round trip. If the remaining power amount is equal to or more than the power cost required for traveling from the own vehicle position to the destination and is less than twice the power cost required for traveling from the own vehicle position to the destination, the state is classified as (2) being capable of arriving at the destination but not capable of a round trip. If the remaining power amount is less than the power cost required for traveling from the own vehicle position to the destination, the state is classified as (3) being not capable of arriving at the destination. In a case where the travel cost calculation section 23 calculates each of a power cost for an outward trip and a power cost for a return trip in consideration of the slope, the state is classified as any of the above-mentioned three levels (1) to (3) based on the calculated power costs for the outward and return trips. In a case where the travelable range calculation section 25 determines that a round trip between the own vehicle position and the destination is not allowed based on the power cost and the remaining power amount, the travelable range calculation section 25 calculates a charging time necessary for a round trip. Then, the travelable range calculation section 25 creates the vehicle information including the travelable range and the charging time, and stores the vehicle information in the vehicle information storage section 27 and moreover transmits the vehicle information to the communication section 26 (S105).

The communication section 26 of the navigation apparatus 2 receives the vehicle information, and then determines whether or not the communication with the outside is allowed (S106). If the communication with the outside is allowed, the communication section 26 transmits the vehicle information (S107), and then ends the process (S108). If the communication with the outside is not allowed, the communication section 26 ends the process without any further action (S108).

Here, in the above description, in a case where the travelable range calculation section 25 determines that a round trip between the own vehicle position and the destination is not allowed based on the power cost and the remaining power amount, the travelable range calculation section 25 calculates the charging time necessary for a round trip. However, it may be also acceptable that, in a case where the travelable range calculation section 25 determines that arrival at the destination is not allowed based on the power cost and the remaining power amount, the travelable range calculation section 25 calculates a charging time necessary for arrival at the destination or a charging time necessary for a round trip to the destination.

Figure 3:
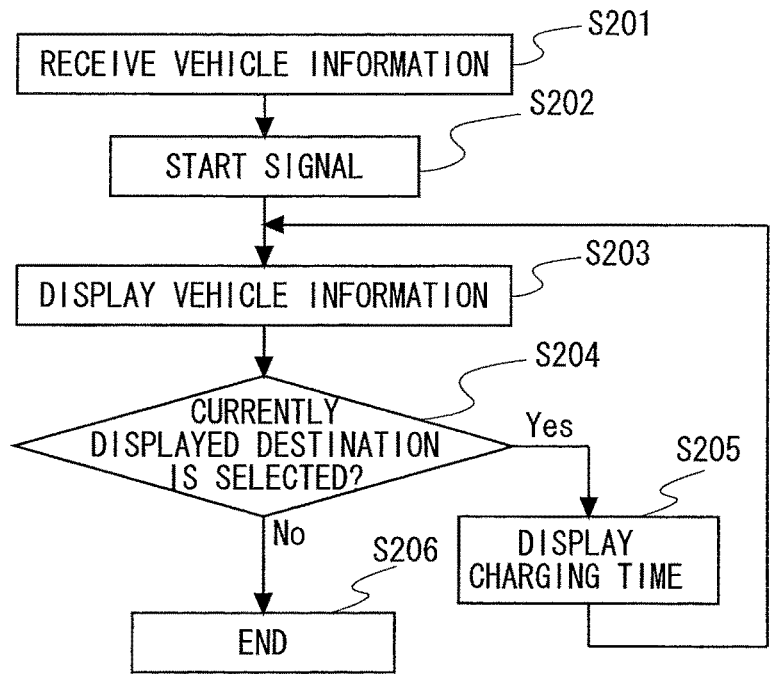
FIG. 3 A flowchart showing an operation of a vehicle information display apparatus of the vehicle information display system according to the embodiment 1 of the present invention.

FIG. 3 is a flowchart showing an operation of the vehicle information display apparatus of the vehicle information display system according to the embodiment 1 of the present invention.

As shown in FIG. 3, the communication section 31 of the vehicle information display apparatus 3 receives the vehicle information from the navigation apparatus 2 (S201). Then, upon reception of a start signal that is inputted through a remote controller or the like by a user, the vehicle information display apparatus 3 starts a vehicle information display process (S202). The control section 32 of the vehicle information display apparatus 3 outputs, to the display device 6, the vehicle information received by the communication section 31. The display device 6 displays the vehicle information (S203).

Here, an exemplary display of the vehicle information on the display device 6 will be shown.

Figure 4:
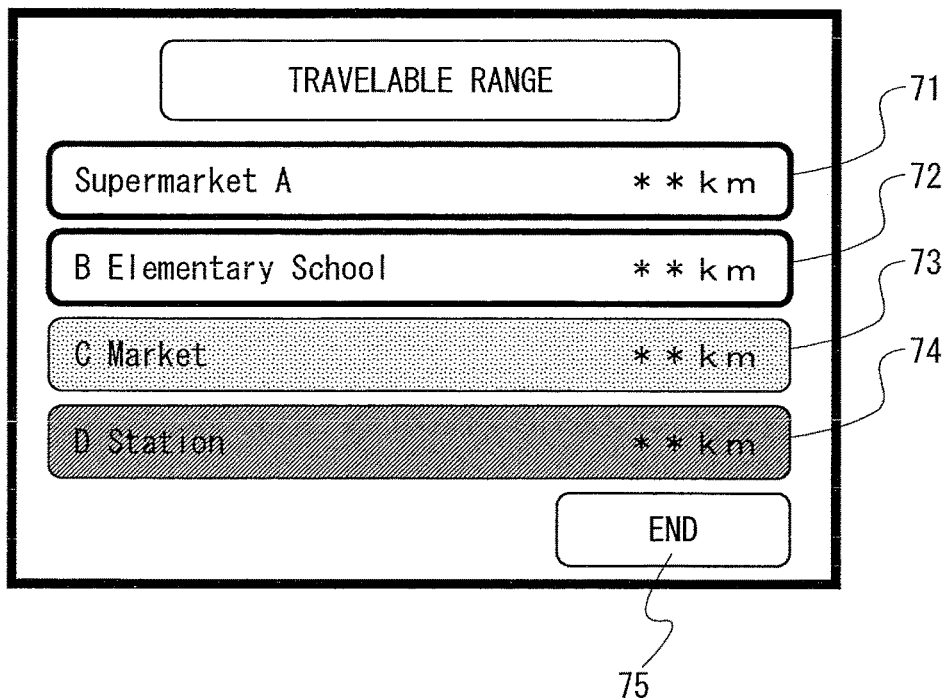
FIG. 4 A diagram showing an exemplary display of vehicle information in the vehicle information display system according to the embodiment 1 of the present invention.

FIG. 4 is a diagram showing an exemplary display of the vehicle information in the vehicle information display system according to the embodiment 1 of the present invention.

In FIG. 4, the display device 6 displays a list of destinations with respect to each travelable range classification. The control section 32 makes the output to the display device 6 so as to display different travelable range classifications in different display manners by, for example, adding colors or highlights. In FIG. 4, the "Supermarket A" 71 and the "B Elementary School" 72 are (1) the destinations to which a round trip is allowed. The "C Market" 73 is (2) the destination to which arrival is allowed but a round trip is not allowed. The "D Station" 74 is (3) the destination to which arrival is not allowed.

Figure 5:
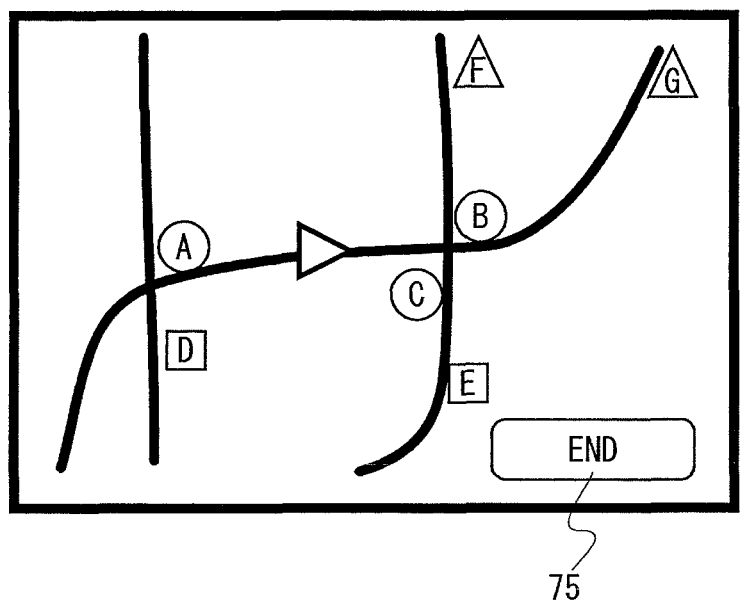
FIG. 5 A diagram showing another exemplary display of the vehicle information in the vehicle information display system according to the embodiment 1 of the present invention.

FIG. 5 is a diagram showing another exemplary display of the vehicle information in the vehicle information display system according to the embodiment 1 of the present invention.

In FIG. 5, the display device 6 displays destinations on a map with different marks for different travelable range classifications. Here, similarly to the case of the list display, the control section 32 makes an output to the display device 6 so as to display different travelable range classifications in different display manners by, for example, changing the color, the shape, and the character of the mark. In FIG. 5, the travelable range for each destination is displayed as a mark having different shapes depending on classifications. The circle indicates (1) the destination to which a round trip is allowed. The square indicates (2) the destination to which arrival is allowed but a round trip is not allowed. The triangle indicates (3) the destination to which arrival is not allowed. In FIG. 5, (A) to (C) are (1) the destinations to which a round trip is allowed, (D) and (E) are (2) the destinations to which arrival is allowed but a round trip is not allowed, and (F) and (G) are (3) the destinations to which arrival is not allowed.

Referring to FIG. 3 again, the control section 32 of the vehicle information display apparatus 3 determines whether or not any destination currently displayed on the display device 6 is selected (S204). If any destination is selected by the input section 33, the control section 32 makes an output to the display device 6 so as to display a charging time necessary for arriving at the destination or a charging time necessary for making a round trip to the destination, and thus the display device 6 displays the charging time (S205). After displaying the charging time, the display device 6 returns to the display of the vehicle information (S203). If no destination is selected by the input section 33 and an end button 75 shown in FIG. 4 or FIG. 5 is selected, the vehicle information display apparatus 3 ends the vehicle information display process (S206).

As described above, in the vehicle information display system according to the embodiment 1 of the present invention, the user can recognize a travelable range even while the user is not riding on the electric vehicle 1, that is, even when, for example, the user is at home before departure. Moreover, the user can also recognize the charging time necessary for arriving at the destination or the charging time necessary for making a round trip to the destination. This enables the user to make a departure with an easy mind. Additionally, the user can start charging in good time before the departure, which can reduce occurrence of a situation where after riding on the electric vehicle 1 the user finds the remaining power amount to be insufficient and the departure is delayed because of necessity of charging. Moreover, it is not necessary to repeat the charging that is not indispensable every day. Only when the remaining power amount is insufficient, a necessary amount of power is charged. This can reduce the number of charge-discharge cycles per certain time period, and also can reduce occurrence of a situation where the shortage of the remaining power amount is found immediately before the departure so that fast charging needs to be performed. Thus, an effect that the lifespan of the battery 5 increases can be exerted.

In the vehicle information display system according to the embodiment 1 of the present invention, the navigation apparatus 2 calculates the power cost and the travelable range. Instead, it may be also possible that the navigation apparatus 2 calculates the power cost, and transmits the remaining power amount, the destination, and the power cost to the vehicle information display apparatus 3, so that the control section 32 of the vehicle information display apparatus 3 having received the remaining power amount, the destination, and the power cost calculates the travelable range. For example, in a case of calculating a travelable range from the home every time, the power cost for each destination is unchanged if the own vehicle position is fixed. Therefore, in the second and subsequent times, the travelable range can be calculated by transmitting only the remaining power amount from the navigation apparatus 2 to the vehicle information display apparatus 3. Thereby, processing performed in the navigation apparatus 2 can be reduced, and the use of the battery 5 of the electric vehicle 1 can be reduced.

Embodiment 2

In the vehicle information display system according to the embodiment 1, the navigation apparatus 2 calculates the recommended travel route by using the own vehicle position information, the map information, the registered destination, and the like, and calculates the power cost necessary for the recommended travel route thus calculated. In a vehicle information display system according to this embodiment 2, the navigation apparatus 2 calculates the power cost by using the own vehicle position information, the map information, a learned destination, and a learned travel pattern. The other parts of the configuration and the other functions are the same as those of the vehicle information display system according to the embodiment 1. Hereinafter, the points different from the embodiment 1 will be mainly described.

The storage section 21 of the navigation apparatus 2 contains not only the map information and the destination including the registered destination that is preliminarily registered by the user, but also a learned destination and a learned travel pattern. The learned destination is a spot that has been previously set as the destination by the user a predetermined number of times or more, or a spot that has been previously visited by the user at a predetermined frequency or more. The learned travel pattern is obtained by learning a previous travel pattern (the travel route and the speed information). The storage section 21 may store a learned travel pattern that includes the recommended travel route from a particular parking position such as the home to the registered destination and speed information. The travel cost calculation section 23 of the navigation apparatus 2 calculates the recommended travel route based on the own vehicle position information, the map information, and the information of the registered or learned destination, etc., or calculates the power cost by using the stored learned travel pattern. If no learned travel pattern is stored in the storage section 21, the travel cost calculation section 23 calculates the recommended travel route by using the own vehicle position information, the map information, and the information of the registered or learned destination, etc., and then calculates the power cost based on the recommended travel route thus calculated. The learned travel pattern is created by using the own vehicle position obtained by the own vehicle position information acquisition section 22 and the speed information obtained by a speed information acquisition section which is not shown, and is stored in the storage section 21.

FIG. 6 is a flowchart showing an operation of a navigation apparatus of a vehicle information display system according to the embodiment 2 of the present invention.

As shown in FIG. 6, at a time of arrival at the home or at a time of key-off, the navigation apparatus 2 starts a travelable range calculation process (S301). The travel cost calculation section 23 of the navigation apparatus 2 obtains the own vehicle position information obtained through the GPS antenna 4 by the own vehicle position information acquisition section 22, and a destination defined by the registered or learned destination stored in the storage section 21 (S302).

Then, the travel cost calculation section 23 determines whether or not any learned travel pattern is stored in the storage section 21 (S303). If any learned travel pattern is stored, the travel cost calculation section 23 calculates the power cost for each destination, by using the map information, the own vehicle position information, the registered or learned destination, and the stored learned travel pattern (S304). If no learned travel pattern is stored, the travel cost calculation section 23 calculates the recommended travel route by using the map information, the own vehicle position information, the information of the registered or learned destination, etc., and the attached information, and then calculates the power cost for each destination based on the recommended travel route thus calculated (S305). The travel cost calculation section 23 transmits the calculated power cost to the travelable range calculation section 25.

The operations in S306 to S310 of the navigation apparatus 2 that are subsequent to the calculation of the power cost are the same as the operations in S104 to S108 of the navigation apparatus 2 according to the embodiment 1.

In the vehicle information display apparatus 3 having received the vehicle information from the navigation apparatus 2, similarly to the embodiment 1, the control section 32 makes an output to the display device 6 so as to display the registered or learned destination according to each travelable range classification, and thus the display device 6 displays the registered or learned destination according to each travelable range classification.

As described above, in the vehicle information display system according to the embodiment 2 of the present invention, the navigation apparatus 2 calculates the travelable range by using, as the destination, the learned destination that is a spot having been previously set as the destination by the user a predetermined number of times or more or a spot having been previously visited by the user at a predetermined frequency or more, and the control section 32 of the vehicle information display apparatus 3 makes an output to the display device 6 so as to display the registered or learned destination according to each travelable range classification. Therefore, even though the destination has not been preliminarily registered, the user can easily recognize whether or not a travel to the destination he/she frequently visits is allowed and whether or not charging is necessary, without riding on the electric vehicle 1. Additionally, since the navigation apparatus 2 calculates the power cost by using the learned travel pattern that is obtained by learning the previous travel pattern, the travelable range can be calculated in accordance with driving characteristics of the user, which enables the travelable range to be calculated with an enhanced accuracy.

The output of the control section 32 of the vehicle information display apparatus 3 may be such that, when the display device 6 displays the registered or learned destination according to each travelable range classification, a destination more frequently visited is displayed in an upper portion. This enables the user to easily recognize whether or not a travel to the destination more frequently visited is allowed and whether or not charging is necessary.

Embodiment 3

In the vehicle information display system according to the embodiment 1, the navigation apparatus 2 calculates the recommended travel route by using the map information, the own vehicle position information, the information of the registered destination, etc., the attached information, and the like, and then calculates the power cost based on the recommended travel route thus calculated. In this embodiment 3, the input section 33 inputs, to the vehicle information display apparatus 3, a travel cost calculation condition that is a condition in calculating the destination or the travel cost. The navigation apparatus 2 calculates the recommended travel route by using not only the map information, the own vehicle position information, and the registered destination but also the destination or the travel cost calculation condition that is inputted by the user, and then calculates the power cost based on the recommended travel route thus calculated. The other parts of the configuration and the other functions are the same as those of the vehicle information display system according to the embodiment 1. Hereinafter, the points different from the embodiment 1 will be mainly described.

Firstly, the operations of the navigation apparatus 2 performed at a time of arrival at the home or at a time of key-off are the same as those of S101 to S108 shown in FIG. 2. Next, an operation of the vehicle information display apparatus 3 will be described.

FIG. 7 is a flowchart showing an operation of a vehicle information display apparatus of a vehicle information display system according to the embodiment 3 of the present invention. FIG. 8 is a diagram showing an exemplary display of the vehicle information in the vehicle information display system according to the embodiment 3 of the present invention. Here, part (a) of FIG. 8 shows an example in which the vehicle information is displayed in the form of a list, and part (b) of FIG. 8 shows an example in which the vehicle information is displayed as marks on the map. In parts (a) and (b) of FIG. 8, a destination input button and a condition input button, in addition to the display shown in FIGS. 4 and 5, are displayed.

Operations of the vehicle information display apparatus 3 from reception of the vehicle information in S401 to display of charging time in S405 shown in FIG. 7 are the same as the operation of the vehicle information display apparatus 3 from the reception of the vehicle information in S201 to display of charging time in S205 shown in FIG. 3. In the vehicle information display apparatus 3 according to the embodiment 3, if the currently displayed destination is not selected in S404 of FIG. 7, the control section 32 determines whether or not the start of a destination input is selected (S406).

As shown in FIG. 8, a destination input button 76 is displayed on a travelable range display screen of the display device 6. In a case where the destination input button 76 is selected by the input section 33 that is implemented as a remote controller or the like, the control section 32 determines that the start of the destination input is selected.

If the start of the destination input is selected, the destination is inputted by the input section 33 (S407), and the control section 32 transmits the inputted destination to the navigation apparatus 2 through the communication section 31 (S408). The navigation apparatus 2 receives the destination, and then calculates the recommended travel route by using the received destination, the map information, the own vehicle position, and the like. Similarly to the processing in S101 to S108 of FIG. 2, the navigation apparatus 2 calculates the travelable range based on the power cost, and transmits to the outside the vehicle information including the travelable range and, as necessary, the charging time.

The control section 32 of the vehicle information display apparatus 3 receives the vehicle information including the re-calculated travelable range from the navigation apparatus 2 through the communication section 31 (S409), and makes an output to the display device 6 so as to display the received vehicle information (S410). Then, the process returns to S403.

If the start of the destination input is not selected in S406, the control section 32 determines whether or not the start of a condition input is selected (S411). As shown in FIG. 8, the condition input button 77 is displayed on the travelable range display screen of the display device 6. In a case where the condition input button 77 is selected by the input section 33 that is implemented as a remote controller or the like, the control section 32 determines that the start of the condition input is selected.

If the start of the condition input is selected, then in S412, the input section 33 inputs the travel cost calculation condition, and the control section 32 transmits the inputted travel cost calculation condition to the navigation apparatus 2 through the communication section 31 (S413). The navigation apparatus 2 receives the condition, and then calculates the recommended travel route by using the map information, the registered destination, the own vehicle position information, and the received travel cost calculation condition. Similarly to the processing in S101 to S108 of FIG. 2, the navigation apparatus 2 calculates the power cost and the travelable range, and transmits to the outside the vehicle information including the travelable range.

Here, the travel cost calculation condition inputted by the input section 33 is, for example, ON/OFF of an air conditioner, ON/OFF of a wiper, ON/OFF of a light, the number of passengers, the load weight, the weather, the air temperature, the date, the time, or a day of the week. As a method for calculating the travel (power) cost by using the inputted condition, a method can be mentioned in which the travel cost calculation section 23 of the navigation apparatus 2 calculates the travel cost in consideration of the amount of power to be used based on the condition of ON/OFF of the air conditioner, the ON/OFF of the wiper, or the ON/OFF of the light. The travel cost calculation section 23 may also calculate the travel cost in consideration of the amount of power to be used while determining ON/OFF of the air conditioner depending on the air temperature or the date, determining ON/OFF of the wiper depending on the weather, or determining ON/OFF of the light depending on the date, a day of the week, or the time. The travel cost calculation section 23 may also calculate the travel cost while predicting an output of the battery based on the air temperature. For example, the travel cost calculation section 23 may calculate the travel cost while determining, based on the date or a day of the week, that the light is OFF on weekdays, the light is OFF in an outward trip on holidays, and the light is ON in a return trip on holidays. The travel cost calculation section 23 may also calculate the travel cost in consideration of a traffic jam based on the time, the date, or a day of the week.

Referring to FIG. 7 again, the control section 32 of the vehicle information display apparatus 3 receives the vehicle information including the re-calculated travelable range and, as necessary, the charging time, from the navigation apparatus 2 through the communication section 31 (S414), and makes an output to the display device 6 so as to display the vehicle information (S415). Then, the process returns to S403. If the input section 33 does not select the destination selection (S404), the destination input (S406), or the condition input (S411) and selects the end button 75, the vehicle information display apparatus 3 ends the vehicle information display process (S416).

As described above, the vehicle information display system according to the embodiment 3 of the present invention exerts the same effects as those of the vehicle information display system according to the embodiment 1, and also enables the user to recognize whether or not a travel to a desired location is allowed, because the vehicle information display apparatus 3 inputs the destination and the travel cost calculation section 23 of the navigation apparatus 2 calculates the power cost required for traveling to the inputted destination. In the vehicle information display system according to the embodiment 3 of the present invention, the travel cost calculation condition is inputted in the vehicle information display apparatus 3, and the travel cost calculation section 23 of the navigation apparatus 2 calculates the travel cost by using the inputted travel cost calculation condition. Therefore, the power cost can be calculated with an enhanced accuracy, and thus the travelable range can be calculated with an enhanced accuracy.

In the vehicle information display system according to the embodiment 3 of the present invention, the travel cost calculation section 23 of the navigation apparatus 2 calculates the travel cost by using the travel cost calculation condition that is inputted by the input section 33 of the vehicle information display apparatus 3. However, it may be also acceptable that a travel cost calculation condition acquisition section that automatically obtains, through Internet or the like, the travel cost calculation condition including, for example, a road state such as traffic jam information or weather information is provided in the navigation apparatus 2 or the vehicle information display apparatus 3, and the travel cost condition acquisition section transmits the travel cost calculation condition to the travel cost calculation section. The travel cost calculation section 23 of the navigation apparatus 2 may calculate the travel cost by using the received travel cost calculation condition. This does not require the user to input the travel cost calculation condition. Therefore, the power cost can be easily calculated with a further enhanced accuracy, and thus the travelable range can be calculated with a further enhanced accuracy.

In the vehicle information display system according to the embodiment 3 of the present invention, the travel cost calculation section 23 of the navigation apparatus 2 calculates the travel cost by using the number of passengers or the load weight that is inputted as the travel cost calculation condition by the input section 33 of the vehicle information display apparatus 3. Here, it may be also acceptable that a measuring apparatus for measuring the number of passengers or the load weight is provided in the electric vehicle 1, and the travel cost calculation section 23 calculates the travel cost by using the number of passengers or the load weight obtained by measurement. This does not require the user to input the number of passengers or the load weight as the travel cost calculation condition. Therefore, the travel cost can be easily calculated with a further enhanced accuracy, and thus the travelable range can be calculated with a further enhanced accuracy.

In the vehicle information display system according to the embodiment 3 of the present invention, the travel cost calculation section 23 calculates the recommended travel route by using not only the map information, the own vehicle position information, the registered destination, and the like, as illustrated in the embodiment 1, but also the destination or the travel cost calculation condition inputted by the user, and then calculates the power cost based on the recommended travel route thus calculated. However, it may be also possible to, as illustrated in the embodiment 2, calculate the power cost by using the destination or the travel cost calculation condition inputted by the user, in addition to the map information, the own vehicle position information, the registered or learned destination, and the learned travel pattern.

In the examples described above, a case where the power cost is the lowest has been described. Instead, in a case where the user selects "time priority" at the time of the condition input described above, such a route that the total link cost is the lowest can be calculated as the recommended travel route. In a case where the user selects "shortest distance", such a route that a total link length is the shortest can be calculated as the recommended travel route. In a case where the user selects "lowest toll fee", such a route that satisfies this condition can be calculated as the recommended travel route. Then, the total power consumption required for these calculated recommended travel route may be converted as the power cost.

On the other hand, in a case where the user selects "economical driving", such a route that the power cost required for traveling to the destination is the lowest may be calculated as the recommended travel route.

Figure 9:
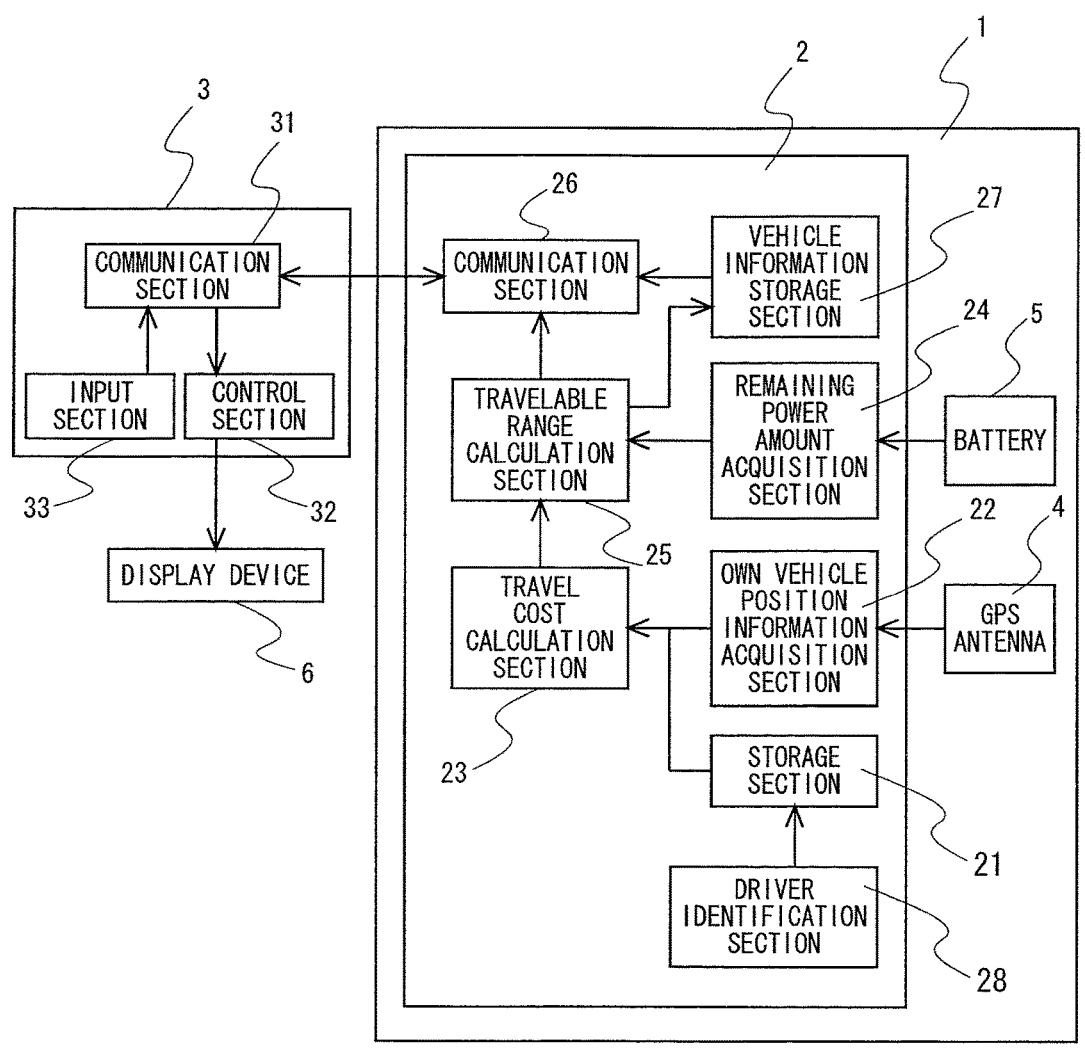
FIG. 9 A block diagram showing another configuration of the vehicle information display system according to the embodiment 3 of the present invention.

FIG. 9 is a block diagram showing another configuration of the vehicle information display system according to the embodiment 3 of the present invention.

As shown in FIG. 9, in the vehicle information display system according to the embodiment 3 of the present invention, a driver identification section 28 for identifying a driver may be provided in the navigation apparatus 2, and the travel pattern of each driver may be stored as the learned travel pattern in the storage section 21. The input section 33 of the vehicle information display apparatus 3 inputs a driver as the travel cost calculation condition, and thereby the travel cost calculation section 23 of the navigation apparatus 2 can calculate the power cost by using the learned travel pattern of each driver. Therefore, the power cost can be calculated for each driver with a further enhanced accuracy, and thus the travelable range can be calculated with a further enhanced accuracy.

FIG. 10 is a block diagram showing another configuration of the vehicle information display system according to the embodiment 3 of the present invention.

As shown in FIG. 10, in the vehicle information display system according to the embodiment 3 of the present invention, the vehicle information display apparatus 3 may includes a travel cost calculation section 34 having the same function as that of the travel cost calculation section 23 of the navigation apparatus 2, and a travelable range calculation section 35 having the same function as that of the travelable range calculation section 25 of the navigation apparatus 2. In a vehicle information display system shown in FIG. 10, the remaining power amount is received as the vehicle information received in S401, and when the input section 33 of the vehicle information display apparatus 3 inputs the travel cost calculation condition, the inputted travel cost calculation condition is not transmitted to the navigation apparatus 2, but the vehicle information display apparatus 3 calculates the power cost and the travelable range by itself. This does not require the vehicle information display apparatus 3 to re-communicate with the navigation apparatus 2. Therefore, the power cost can be easily calculated with an enhanced accuracy.

Embodiment 4

In a vehicle information display system according to this embodiment 4, in the vehicle information display apparatus 3, the communication section 31 has a function for transmitting a signal to a charger, and when a charge start signal is inputted thereto by the input section 33, transmits the charge start signal to the charger. The other parts of the configuration and the other functions are the same as those of the vehicle information display system according to the embodiment 1. Hereinafter, the points different from the embodiment 1 will be mainly described.

Figure 11:
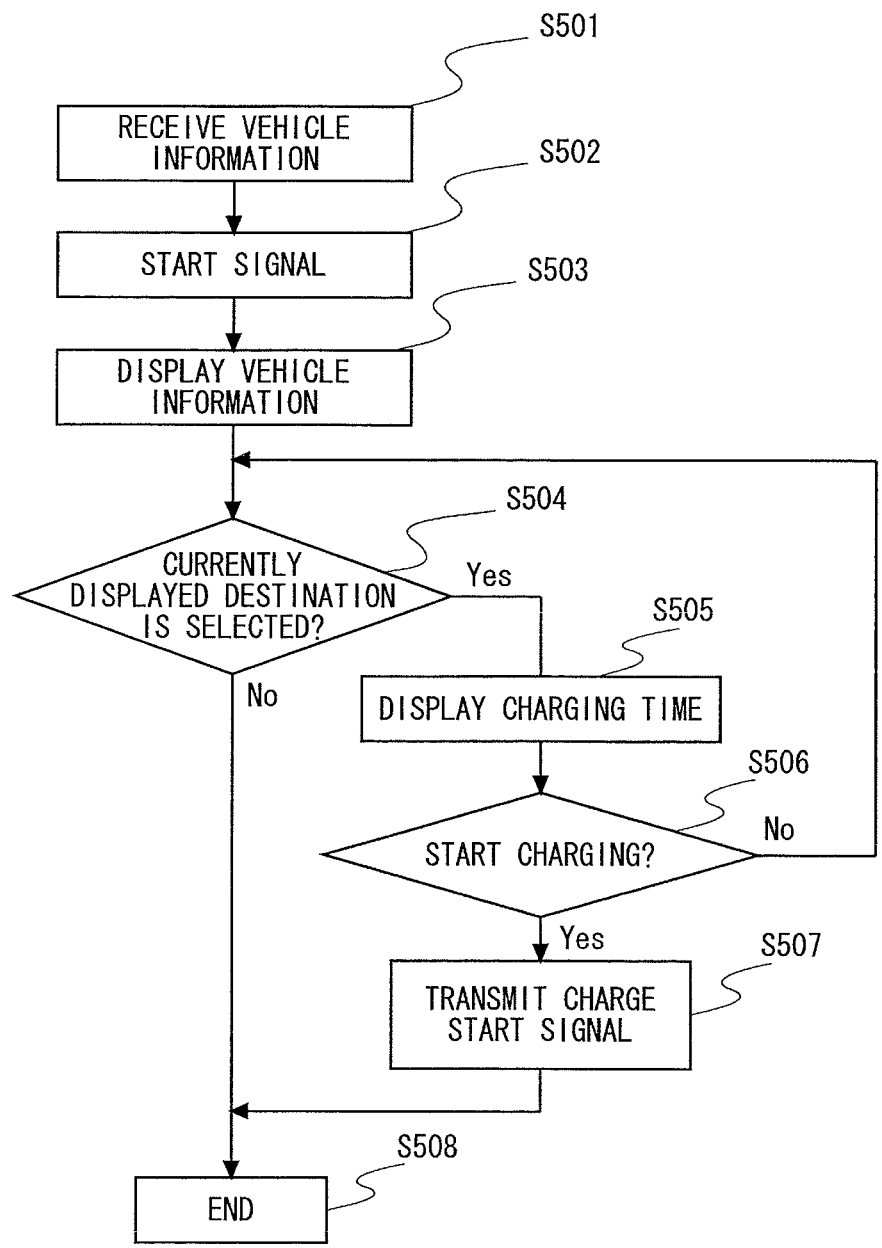
FIG. 11 A flowchart showing an operation of a vehicle information display apparatus of a vehicle information display system according to an embodiment 4 of the present invention.

FIG. 11 is a flowchart showing an operation of a vehicle information display apparatus of a vehicle information display system according to the embodiment 4 of the present invention.

Operations of the vehicle information display apparatus 3 from reception of the vehicle information in S501 to display of charging time in S505 shown in FIG. 11 are the same as the operation of the vehicle information display apparatus 3 from the reception of the vehicle information in S201 to display of charging time in S205 shown in FIG. 3.

The control section 32 of the vehicle information display apparatus 3 determines whether or not the charge start signal is inputted by the input section 33 (S506). If the charge start signal is inputted, the control section 32 transmits, through the communication section 31, the charge start signal to the charger that is connected to the battery of the electric vehicle 1 (S507), and then ends the process.

As described above, in the vehicle information display system according to the embodiment 4 of the present invention, the same effects as those of the vehicle information display system according to the embodiment 1 are exerted, and also the communication section 31 of the vehicle information display apparatus 3 has the function for transmitting the signal to the charger so that, when the charge start signal is inputted thereto by the input section 33, the communication section 31 transmits the charge start signal to the charger. This enables the user to charge the electric vehicle without going to a garage.

It may also be possible that, after the charging is completed, the charger transmits a charge end signal to the vehicle information display apparatus 3, and the control section 32 having received the charge end signal through the communication section 31 of the vehicle information display apparatus 3 makes an output to the display device 6 so as to display the completion of the charging or outputs a melody, a sound, or the like, so as to notify the completion of the charging. This enables the user to recognize the completion of the charging of the electric vehicle 1 without going to a garage. By re-calculating a travelable range at a time when the charging is completed, the user can recognize a more accurate travelable range before departure.

Needless to say, the vehicle information display system according to the embodiment 4 of the present invention can be implemented in combination with the vehicle information display systems according to the embodiments 2 and 3.

The invention claimed is:

1. An apparatus mounted on an electric vehicle, comprising:
   a processor to execute a program; and
   a memory to store the program which, when executed by the processor, results in performance of steps comprising:
      acquiring a remaining power amount of a battery of said electric vehicle from a remaining power amount acquisition section mounted on said electric vehicle;
      calculating a travelable distance of said electric vehicle based on said remaining power amount and a travel cost calculation condition which includes ON/OFF of an air conditioner of said electric vehicle; and
      transmitting vehicle information that includes said travelable distance from said electric vehicle, via the Internet, to a display device located outside said electric vehicle, and physically disconnected from said electric vehicle,
   wherein said travelable distance is displayed by said display device so as to be visible to a vehicle user when said vehicle user is not riding on said electric vehicle.

2. An apparatus located outside of an electric vehicle, comprising:
   a processor to execute a program; and
   a memory to store the program which, when executed by the processor, results in performance of steps comprising:
      acquiring, via the Internet, a remaining power amount of a battery of said electric vehicle, which is acquired by an remaining power amount acquisition section mounted on said electric vehicle, from said electric vehicle;
      calculating a travelable distance of said electric vehicle based on said remaining power amount and a travel cost calculation condition which includes ON/OFF of an air conditioner of said electric vehicle; and
      outputting vehicle information that includes said travelable distance to a display device located outside said electric vehicle, and physically disconnected from said electric vehicle,
   wherein said travelable distance is displayed by said display device so as to be visible to a vehicle user when said vehicle user is not riding on said electric vehicle.

3. An apparatus mounted on an electric vehicle, comprising:
   a processor to execute a program; and
   a memory to store the program which, when executed by the processor, results in performance of steps comprising:
      acquiring a remaining power amount of a battery of said electric vehicle from an remaining power amount acquisition section mounted on said electric vehicle; and
      transmitting said remaining power amount from said electric vehicle, via the Internet, to an apparatus located outside said electric vehicle,
   wherein a travelable distance is calculated based on said remaining power amount and a travel cost calculation condition which includes ON/OFF of an air conditioner of said electric vehicle by said apparatus located outside said electric vehicle, and is displayed by a display device located outside said electric vehicle so as to be visible to a vehicle user when said vehicle user is not riding on said electric vehicle.

4. A vehicle information display system, comprising:
   an apparatus mounted on an electric vehicle, comprising;
      a first processor to execute a program; and
      a first memory to store the program which, when executed by the first processor, results in performance of steps comprising:
         acquiring a remaining power amount of a battery of said electric vehicle from a remaining power amount acquisition section mounted on said electric vehicle; and
         transmitting said remaining power amount from said electric vehicle, via the Internet, to an apparatus located outside said electric vehicle,
   said apparatus located outside said electric vehicle, comprising;
      a second processor to execute a program; and a second memory to store the program which, when executed by the second processor, results in performance of steps comprising:
- acquiring said remaining power amount from said apparatus mounted on said electric vehicle;
- calculating a travelable distance of said electric vehicle based on said remaining power amount and a travel cost calculation condition which includes ON/OFF of an air conditioner of said electric vehicle; and
- outputting vehicle information that includes said travelable distance to a display device located outside said electric vehicle, and physically disconnected from said electric vehicle, said display device located outside said electric vehicle, configured to:
- acquire said travelable distance from said apparatus located outside said electric vehicle; and
- display said travelable distance so as to be visible to a vehicle user when said vehicle user is not riding on said electric vehicle.

5. An vehicle information display control method comprising:
- acquiring, from an electric vehicle, a remaining power amount of a battery of said electric vehicle, which is acquired by an remaining power amount acquisition section mounted on said electric vehicle;
- calculating a travelable distance of said electric vehicle based on said remaining power amount and a travel cost calculation condition which includes ON/OFF of an air conditioner of said electric vehicle; and
- outputting vehicle information that includes said travelable distance to a display device located outside said electric vehicle, and physically disconnected from said electric vehicle,
- wherein said travelable distance is displayed by said display device so as to be visible to a vehicle user when said vehicle user is not riding on said electric vehicle, and
- wherein at least one of said acquiring and said outputting is performed via the Internet.

6. The apparatus according to claim 1, wherein said steps further comprise:
- receiving a charge start signal from an input section of said display device; and
- outputting said charge start signal to said electric vehicle.

7. The apparatus according to claim 2, wherein said steps further comprise:
- receiving a charge start signal from an input section of said display device; and
- outputting said charge start signal to said electric vehicle.

8. The apparatus according to claim 3, wherein said steps further comprise:
- receiving a charge start signal from an input section of said display device; and
- outputting said charge start signal to said electric vehicle.

9. The method according to claim 5, further comprising:
- receiving a charge start signal from an input section of said display device; and
- outputting said charge start signal to said electric vehicle.

10. The apparatus according to claim 6, wherein said steps further comprise:
- receiving a charge completion signal from said electric vehicle; and
- outputting said charge completion signal to said display device,
- wherein said charge completion is outputted to said vehicle user by said display device.

11. The apparatus according to claim 7, wherein said steps further comprise:
- receiving a charge completion signal from said electric vehicle; and
- outputting said charge completion signal to said display device,
- wherein said charge completion is outputted to said vehicle user by said display device.

12. The apparatus according to claim 8, wherein said steps further comprise:
- receiving a charge completion signal from said electric vehicle; and
- outputting said charge completion signal to said display device,
- wherein said charge completion is outputted to said vehicle user by said display device.

13. The method according to claim 9, further comprising:
- receiving a charge completion signal from said electric vehicle; and
- outputting said charge completion signal to said display device,
- wherein said charge completion is outputted to said vehicle user by said display device.

14. The apparatus according to claim 1, wherein said steps further comprise:
- receiving a destination which inputted by an input section of said display device;
- calculating a travelable distance of said electric vehicle based on said remaining power amount and said destination; and
- outputting a power cost to said display device,
- wherein said power cost is outputted to said vehicle user by said display device.

15. The apparatus according to claim 2, wherein said steps further comprise:
- receiving a destination which inputted by an input section of said display device;
- calculating a travelable distance of said electric vehicle based on said remaining power amount and said destination; and
- outputting a power cost to said display device,
- wherein said power cost is outputted to said vehicle user by said display device.

16. The apparatus according to claim 3, wherein said steps further comprise:
- receiving a destination which inputted by an input section of said display device;
- calculating a travelable distance of said electric vehicle based on said remaining power amount and said destination; and
- outputting a power cost to said display device,
- wherein said power cost is outputted to said vehicle user by said display device.

17. The method according to claim 5, further comprising:
- receiving a destination which inputted by an input section of said display device;
- calculating a travelable distance of said electric vehicle based on said remaining power amount and said destination; and
- outputting a power cost to said display device,
- wherein said power cost is outputted to said vehicle user by said display device.

* * * * *